United States Patent [19]
Stolzer et al.

[11] Patent Number: 5,671,789
[45] Date of Patent: Sep. 30, 1997

[54] DEPTH OF CUT LOCKING MECHANISM FOR A PLUNGE-TYPE ROUTER

[75] Inventors: J. Timothy Stolzer, Pickens; Ronald C. McCurry, West Union; Charles D. Winchester, Easley, all of S.C.

[73] Assignee: Ryobi North America, Easley, S.C.

[21] Appl. No.: 321,149

[22] Filed: Oct. 11, 1994

Related U.S. Application Data

[63] Continuation-in-part of Ser. No. 122,390, Sep. 16, 1993, Pat. No. 5,353,852.
[51] Int. Cl.$^6$ ............................................. B27C 5/10
[52] U.S. Cl. .......................... 144/154.5; 144/136.95; 409/182
[58] Field of Search .................. 144/134 R, 134 D, 144/136 R, 136 C, 371, 134.1, 136.95, 136.1, 154.5; 409/181, 182

[56] References Cited

U.S. PATENT DOCUMENTS

| | | |
|---|---|---|
| 3,908,510 | 9/1975 | Koskolos et al. |
| 4,239,428 | 12/1980 | Berrina ............... 144/136 C |
| 4,319,860 | 3/1982 | Beares ................ 144/136 C |
| 4,566,830 | 1/1986 | Maier et al. |
| 4,652,191 | 3/1987 | Bernier. |
| 4,770,573 | 9/1988 | Monobe. |
| 5,191,921 | 3/1993 | McCurry. |
| 5,273,089 | 12/1993 | Fuchs et al. ........ 144/136 C |

*Primary Examiner*—W. Donald Bray
*Attorney, Agent, or Firm*—Brooks & Kushman P.C.

[57] ABSTRACT

A depth of cut lock mechanism for a plunge-type router having a drive motor enclosed within a motor housing. The motor housing is attached to a base plate by a pair of spatially separated guides. Each guide has a guide sleeve attached to the motor housing and a guide tube attached to the base plate and slidably received in the guide sleeve. The lock mechanism has a lock disc rotatable between a lock position and a release position by a manually activated lever displaces the lock disc toward the unlocked position. The lever is pivotable about an axis parallel a guide tube and is located adjacent to a handle of the router so that the lever can be activated by the user while grasping the router handle.

16 Claims, 4 Drawing Sheets

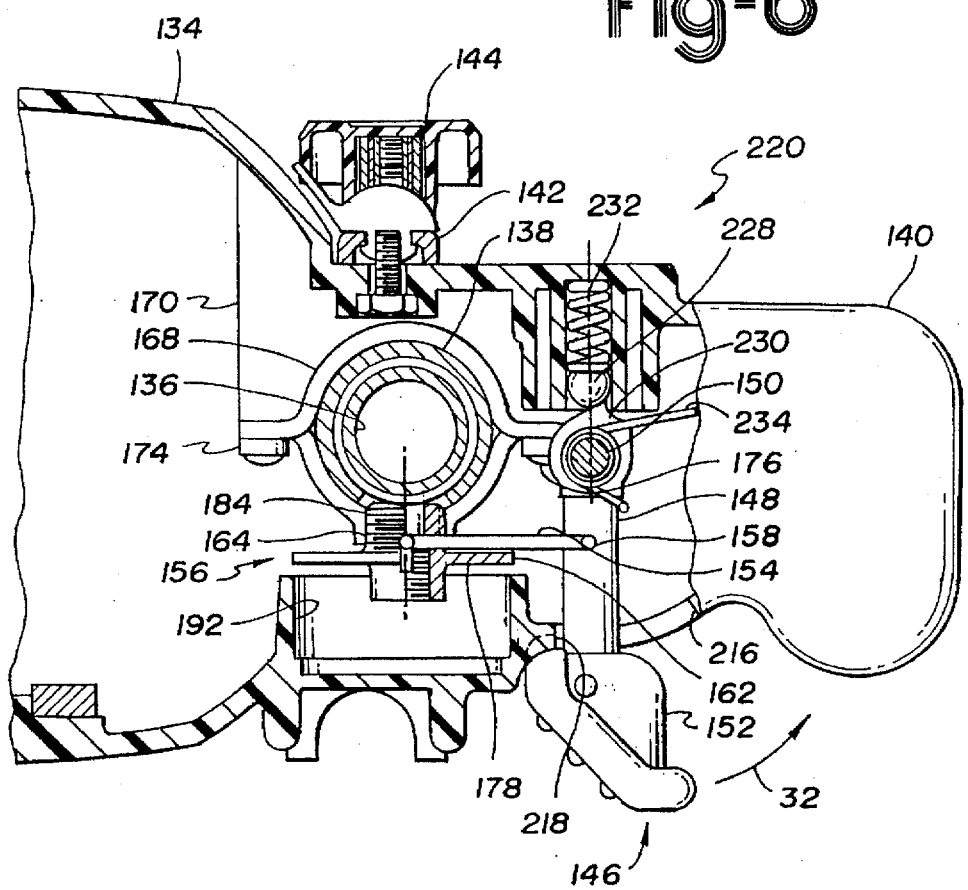
fig=6
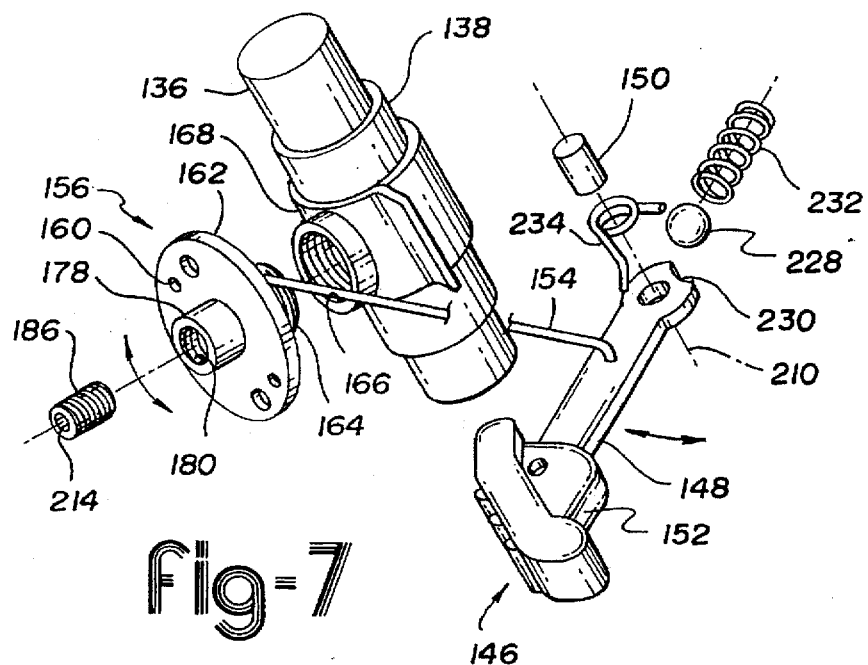
fig=7

DEPTH OF CUT LOCKING MECHANISM FOR A PLUNGE-TYPE ROUTER

RELATED APPLICATION

This application is a continuation-in-part of commonly owned U.S. patent application Ser. No. 08/122,390 filed on Sep. 16, 1993, issued as U.S. Pat. No. 5,353,852 on Oct. 11, 1994.

TECHNICAL FIELD

The invention is related to the field of plunge-type routers and, in particular, to a depth of cut locking mechanism locking the location of the router relative to the base plate.

BACKGROUND ART

Plunge-type routers are similar to conventional routers in that they have a drive motor secured within a motor housing. The drive motor has a shaft extending external to the motor housing in a direction toward a base plate attached thereto. A collet or chuck for holding a cutting tool is attached to the external end of the shaft. The motor housing is connected to the base plate by a pair of spatially separated vertical guides.

In conventional types of routers, the motor housing is locked to the vertical guides in a position relative to the base plate such that the cutting tool projects a fixed distance beyond the lower workpiece engaging surface of the base plate at all times. In contrast, plunge-type routers have means for retracting the motor housing so that the cutting tool is above the work engaging surface of the base plate during periods of non-use. In order to enable a plunge-type router to be displaced or "plunged" to the desired cutting depth, adjustable depth stop mechanisms are conventionally provided and may include depth of cut locking mechanisms which lock the position of the router relative to the work engaging surface of the base plate at any desired depth of cut.

Plunge-type routers typically include a pair of handles by means of which the operator may hold and guide the router during use. These handles are also used when the operator "plunges" the router to its desired depth of cut. Once the router is displaced to its desired depth of cut, the motor housing is locked to the vertical guides providing a fixed relationship between the router and the work engaging surface of the base plate. This permits the operator to concentrate on guiding the router without having to worry about the depth of cut.

The invention is a depth of cut locking mechanism for a plunge-type router having a normally locked state which is manually releasable.

SUMMARY OF THE INVENTION

The invention is a depth of cut locking mechanism for locking the position of a plunge-type router relative to a base plate. The router has a motor housing connected to the base plate by a pair of spatially separated telescoping guides. Each of the telescoping guides has a guide sleeve fixedly disposed in the motor housing and a guide tube attached to the base plate. The guide tube is slidably disposed in the guide sleeve.

The depth of cut locking mechanism consists of a lever pivotably attached to the motor housing which is manually displaceable from a lock position to a release position. A mounting bracket secures the guide sleeve to the motor housing. The mounting bracket has a threaded aperture normal to the axis of the guide sleeve. A lock disc has a threaded boss threadably received in the threaded aperture of the mounting bracket. The lock disc is rotatable about an axis concentric with the threaded boss and is rotatable between a lock position and a release position. The lock disc is axially displaced by the threads on the threaded boss toward the guide sleeve when the lock disc is rotated toward the lock position and axially displaced away from the guide sleeve when the lock disc is rotated toward the release position. A lever and link mechanism is provided for producing a torque for urging the lock disc toward the lock position and rotating the lock disc toward the release position in response to the displacement of the lever. Means are further provided on the lock disc for frictionally locking the guide tube to the guide sleeve in response to the axial displacement of the lock disc to the lock position.

Another advantage of the locking mechanism is that the location of the friction element that engages the guide tube to lock the guide sleeve and the guide tube to each is adjustable to compensate for wear.

These and other advantages will become more apparent from a reading of the detailed description of the invention in conjunction with the drawings.

BRIEF DESCRIPTION OF THE DRAWINGS

FIG. 6 is a partial cross-section view of an alternative embodiment of the invention; and FIG. 7 is an exploded perspective view showing the individual elements of the locking mechanism of the alternative embodiment of the invention shown in FIG. 6.

DETAILED DESCRIPTION OF THE INVENTION

Figure 1:
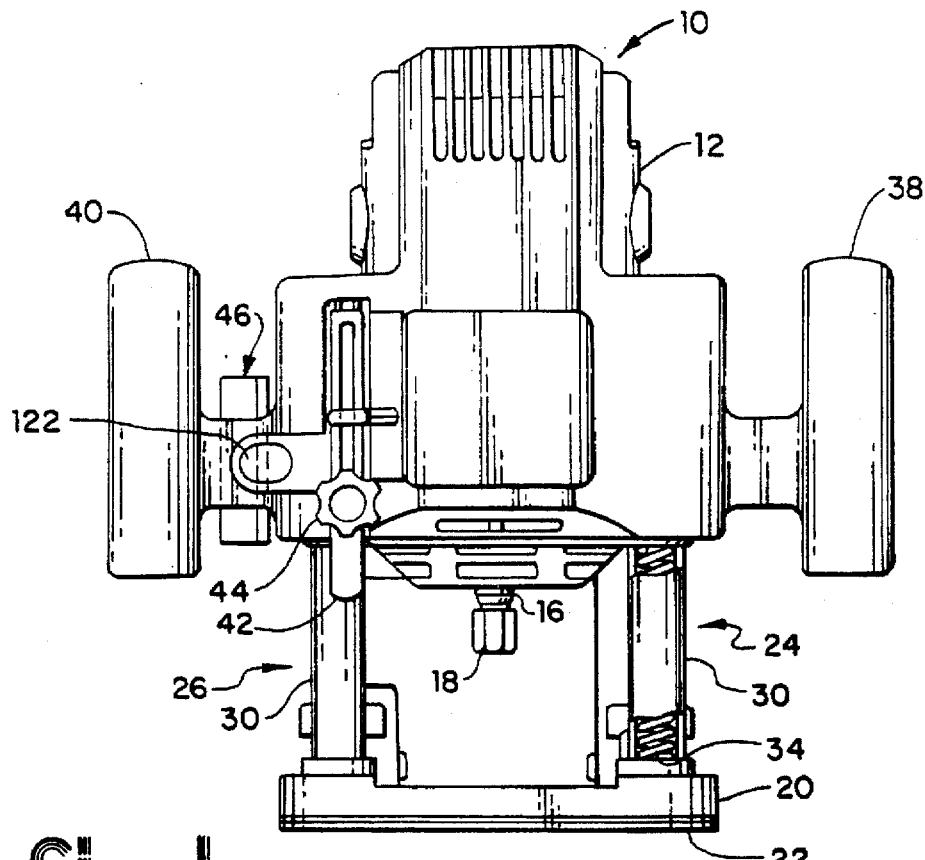
FIG. 1 is a front view of the plunge-type router.
Figure 2:
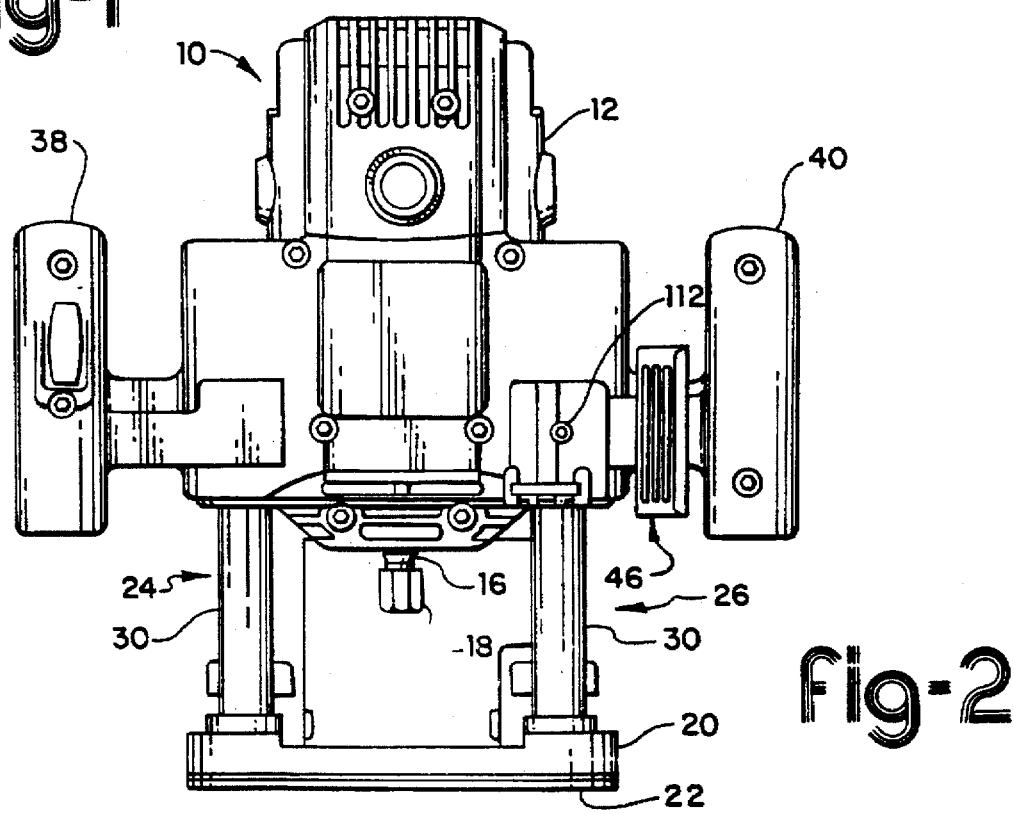
FIG. 2 is a rear view of the plunge-type router.

A plunge-type router 10 incorporating an arrangement according to the invention is shown in FIGS. 1 and 2. The router 10 has a motor housing 12 which houses a drive motor 14 as shown in the cross-sectional view of FIG. 3. The drive motor 14 has a shaft 16 which extends external to the motor housing 12 at a lower end thereof. A collet or chuck 18, adapted to hold a cutting tool, is attached to the distal end of the shaft 16 as shown.

A base plate 20 having a work engaging surface 22 is connected to the motor housing 12 by a pair of telescoping guides 24 and 26. Each of the telescoping guides 24 and 26 consist of a guide sleeve 28 disposed inside the router housing 12 on opposite sides of the drive motor 14 and a guide tube 30 attached to said base plate 20. The guide tube 30 is slidably received in the guide sleeve 28 as more clearly shown in FIG. 3. The guide tubes 30 are disposed normal to the work engaging surface 22 of the base plate 20 and guide the displacement of the router 10 normal to the work engaging surface 22. The telescoping guides 24 and 26 maintain the orientation of the router 10 relative to the base plate 20 and allow the router 10 to be displaced relative thereto.

Figure 3:
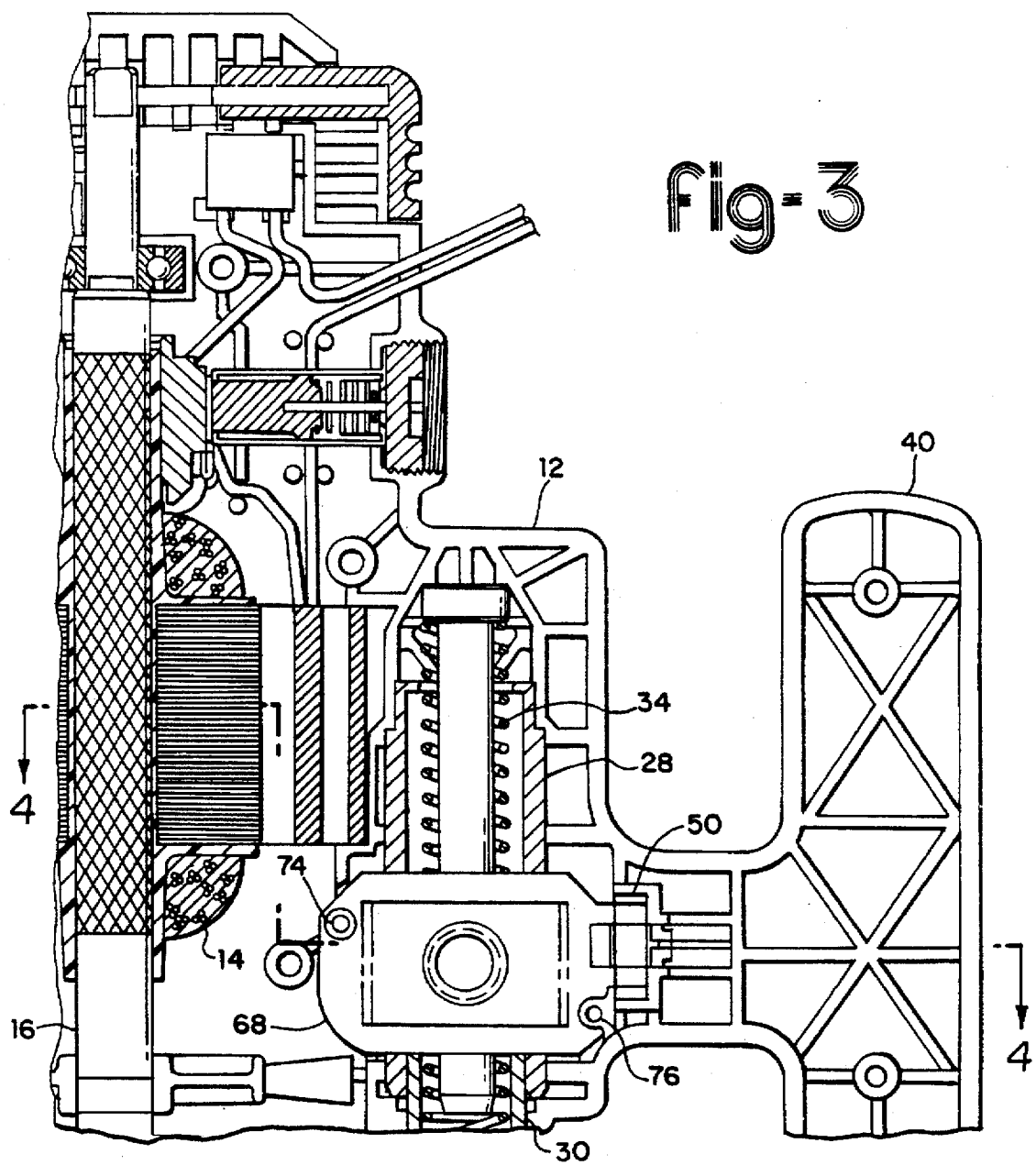
FIG. 3 is a partial cross-sectional view of the motor housing 12.

A coil spring 34, as shown in FIGS. 1 and 3, is disposed within the telescoping guides 24 and 26 and resiliently biases the router 10 away from the base plate 20 with a force sufficient to counterbalance the gravitational forces acting on the router 10 when the telescoping guides 24 and 26 are vertically disposed.

When using a plunge router of the type shown in FIGS. 1 and 2, the operator places the work engaging surface 22 of the base plate 20 on a surface of a workpiece. The operator grasps the handles 38 and 40, which are integral with the motor housing 12, and displaces the router 10 toward the workpiece against the force of the coil springs 34 until the cutting tool attached to collet 18 is at the desired location relative to the workpiece. A movable stop bar 42 may be attached to the motor housing 12 to preset the location of the cutting tool relative to the workpiece. The stop bar 42 may be locked in place by a clamp 44.

Once the motor housing 12 and the cutting tool have been displaced to the desired location, it is desirable to lock the motor housing 12 to the telescoping guides 24 and 26. According to this invention, there is provided a depth of cut locking mechanism for locking the motor housing 12 to the telescoping guide 26 at the desired location, or any other location within the limits of the telescoping guides 24 and 26.

Figure 4:
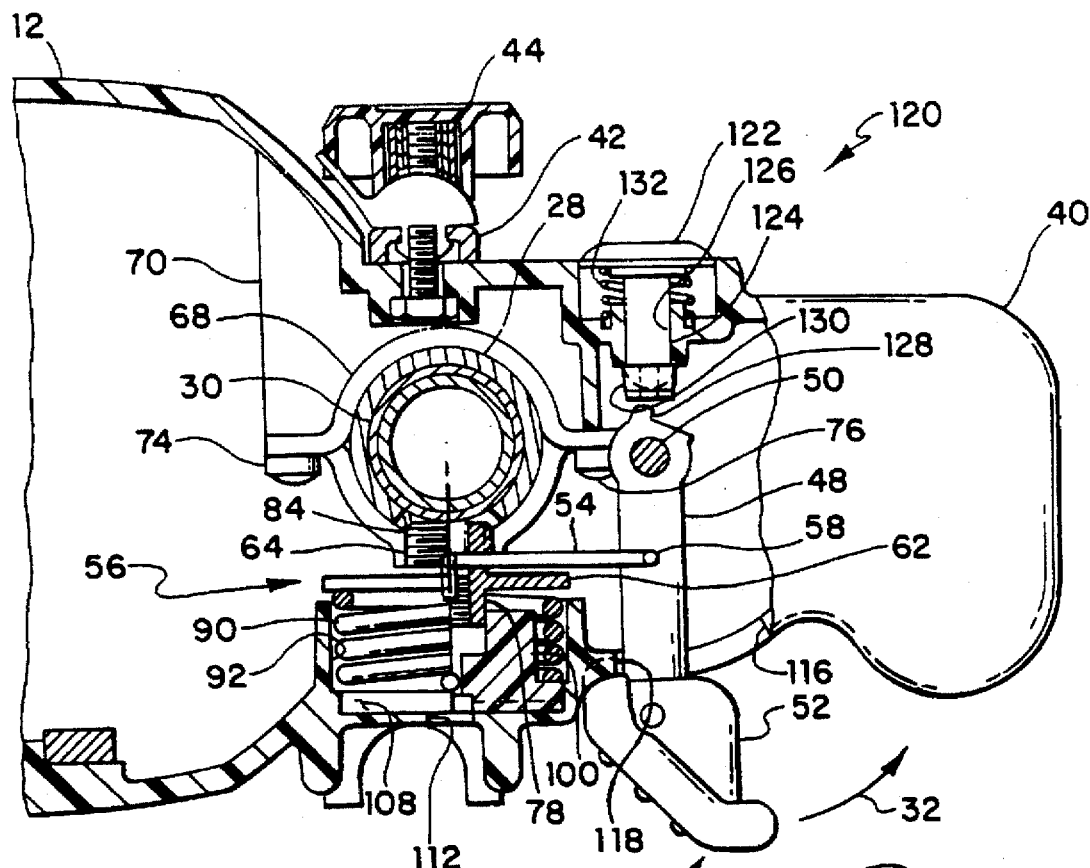
FIG. 4 is a partial cross-sectional view taken along lines 4—4 shown in FIG. 3.

Referring now to FIG. 4, the depth of cut locking mechanism consists of a release lever 46 pivotably mounted to the motor housing 12. The release lever 46 has an internal portion 48 which is pivotably connected to a pivot pin 50 and an external portion 52 extending through a slot provided in the motor housing 12 and is accessible to the operator when he grasps the handle 40. An actuator rod 54 connects the internal portion 48 of the release lever 46 to a lock disc 56. One end of the actuator rod 54 has a first tang received in an appropriate aperture 58 provided in the internal portion 48 of the release lever 46 and the other end of the actuator rod 54 has a second tang received in an appropriate aperture 60 provided through a disc portion 62 of the lock disc 56.

Figure 5:
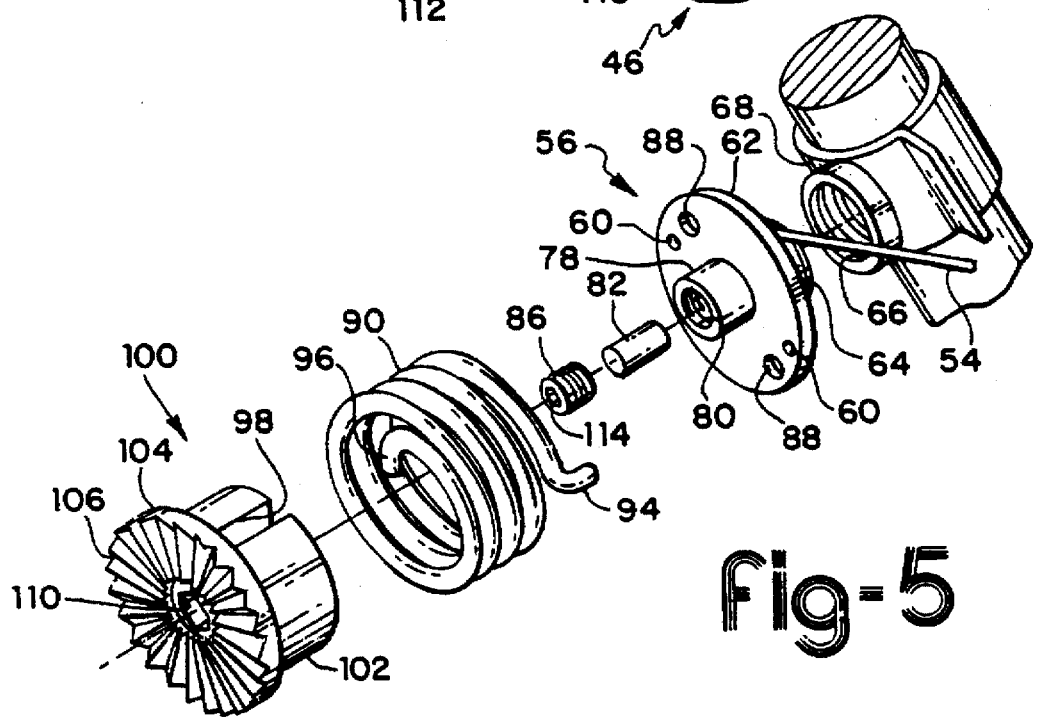
FIG. 5 is an exploded perspective view showing the individual elements of the locking mechanism internal to the motor housing.

In the preferred embodiment, the disc portion 62 of the lock disc 56 has at least two (2) diametrically opposed apertures 60, as shown in FIG. 5. The lock disc 56 has a left hand threaded boss 64, which is threadably received in a threaded aperture 66 provided in sleeve clamp 68. The sleeve clamp 68 secures the guide sleeve 28 in the motor housing 12. The sleeve clamp 68 is secured to an internal boss 70 provided in the motor housing 12 by threaded fasteners, such as bolts 74 and 76.

The lock disc 56 also has a spring guide boss 78 provided on the side of the disc portion 62 opposite the threaded boss 64 and a bore 80 provided therethrough concentric with the spring guide and threaded bosses 78 and 64, respectively. The bore 80 is threaded at least part way therethrough as shown in FIG. 5. A brass plug 82 is slidably received in the bore 80 and passes through a concentric clearance aperture 84 provided in the sleeve guide 28 to engage the guide tube 30. A set screw 86 is threadably received in the threaded bore 80 to urge the brass plug 82 into locking engagement with the guide tube 30 when the release lever 46 is resiliently biased to the position shown in FIG. 4 as shall be explained hereinafter.

The disc portion 62 of the lock disc 56 also has at least one spring tang bore 88. Preferably, the disc portion 62 has two diametrically opposed spring tang bores 88, as shown in FIG. 5. A torsional spring 90 is disposed in a well 92 provided in the motor housing 12. The torque spring 90 has a first tang 94 provided at one end thereof which extends in an axial direction and is receivable in one of the spring tang bores 88 of the lock disc 56. A second tang 96 is disposed in an inward radial direction and is received in a slot 98 in a ratchet member 100 disposed at the bottom of the well 92. The ratchet member 100 has a cylindrical spring guide portion 102 in which is formed a slot 98 and a ratchet portion 104 having a series of radially extending unidirectional ratchet teeth 106 which engage a mating set of unidirectional ratchet teeth 108 provided at the bottom of well 92. The torsional spring 90 also provides a resilient axial force urging the ratchet teeth 106 of the ratchet member 100 into locking engagement with the ratchet teeth 108 at the bottom of the well 92.

The ratchet member 100 has an axially disposed hexagonally-shaped through bore 110 sized to receive a standard size hexagonal wrench such as a standard size Allen wrench. The motor housing 12 has a coaxially aligned aperture 112 which permits the Allen wrench to be inserted into the hexagonally-shaped through bore 110 from outside the motor housing 12. The set screw 86 also has a hexagonally-shaped bore 114 adapted to receive a smaller Allen wrench. The hexagonally-shaped bore 114 is smaller than hexagonally-shaped bore 110 and is axially aligned with and can rotate within the hexagonally-shaped bore 110 so that the smaller Allen wrench can be inserted into hexagonally-shaped bore 114 through the aperture 112 provided in the motor housing 12 and the hexagonally-shaped through bore 110.

In the adjustment of the locking mechanism, the location of the brass plug 82 is adjusted by rotating set screw 86 so that when the lock disc 56 is rotated to its unlocked position by the displacement of the release lever 46 in a counter-clockwise direction indicated by arrow 32 as shown in FIG. 4 to an unlocked position adjacent to the end 116 of the slot provided in the motor housing 12, the brass plug 82 will be disengaged from the guide tube 30. When the lock disc 56 is rotated in a clockwise direction to its lock position by the torsional spring 90, the brass plug will forcibly engage the guide tube 30 frictionally locking the guide tube 30 within the guide sleeve 28 and the release lever 46 will be returned to the other end 118 of the slot.

The rotation of the ratchet member 110 in a counter-clockwise direction by an Allen wrench inserted into hexagonally-shaped through bore 110 will increase the resilient torque exerted by torsional spring 90 on the lock disc 56 urging the lock disc 56 in a counter-clockwise direction toward its locked position and urging the release lever 46 in a clockwise direction toward mechanical stop 118. Because the threads on the threaded boss 64 are left-handed threads, the counter-clockwise rotation of the lock disc 56 will physically displace the lock disc 56 and the brass plug 82 toward the guide tube 30. With the lock disc in its locked position, the ratchet member 100 is rotated in a counter-clockwise direction until the torque exerted by torsional spring 90 on the lock disc 56 is sufficient to produce an axial force on the brass plug 82 to frictionally lock the guide tube 30 to the guide sleeve 28.

The manual displacement of the release lever in a counter-clockwise direction, as shown by arrow 32 in FIG. 4, will rotate the stop disc 56 in a clockwise direction against the force of torsional spring 90, retracting the lock disc 56 and the brass plug away from the guide tube 30 permitting the guide tube 30 to be freely displaced relative to guide sleeve 28. This permits the router 10 to be freely displaced relative to the base plate 20. Upon releasing the release handle 46, the torque generated by the torsional spring 90 will urge the lock disc 56 to its locked position and displace the release handle 46 in a clockwise direction toward its locked position adjacent to mechanical stop 118.

In the adjustment of the location of the brass plug 82 by set screw 86, it is preferred that when the stop disc is rotated to its lock position by the torque provided by torsional spring 90, the release handle 46 is displaced a small distance from the mechanical stop 118. This arrangement permits the full torque provided by coil spring 90 to be applied to the stop disc 56 urging its counter-clockwise rotation. In turn, this full torque is translated into an axial force on brass plug 82 frictionally locking the guide tube 30 in the guide sleeve 28.

A release lever locking mechanism 120 is also provided to lock the release lever 46 in the unlocked position. The release lever locking mechanism 120 consists of a spring-loaded button 122 provided on the side of the motor housing 12 opposite the release lever 46. The spring-loaded button 122 has a shaft 124 which extends into the motor housing 12 through an aperture 126 to a location adjacent to the end of the internal portion 48 of the release lever 46. A dog 128 is provided on the end of the internal portion 48 of the release lever 46 which is engageable by a dog catch 130 provided on the end of the shaft 124 when the release handle 46 is displaced counter-clockwise to the released position and the button 122 is depressed. Releasing the release lever 46 from the release position with the button 122 depressed will frictionally engage the dog catch 130 with the dog 128 holding the button in the depressed position. A subsequent displacement of the release lever 48 in a counter-clockwise direction will disengage the dog catch 130 from the dog 128 permitting the spring 132 to return the button 122 to its undepressed location. The release lever 46 then may be fully displaced clockwise to its lock position.

An alternative embodiment of the depth of cut locking mechanism 220 is illustrated in FIGS. 6 and 7. The front, rear and cross-sectional views of a plunge type router incorporating the alternative embodiment of the locking mechanism are substantially similar to FIGS. 1, 2 and 3 illustrating the first embodiment and are therefore now repeated. Since many of the components of alternative locking mechanism 220 are identical to first embodiment of locking mechanism 120 to the extent possible, numbers of components have been increased the value of 100 so that the description of the second embodiment can focus on the differences between the two mechanisms.

Locking mechanism 220 of the second embodiment at first glance looks very similar to locking mechanism 120, however, the locking mechanism maintains the housing in the normally released state so that it can move axially relative to the pair of router guide tubes 126 projecting upwardly from the router base plate. Lever 146 is pivotably connected to housing 134 by pivot pin 150. Lever 146 is free to rotatably pivot about pivot axis 210 which extends parallel to guide tube 136. Lever 146 is provided with an internal portion 148 located within router housing 134 and an external portion 152 located external to the housing adjacent router handle 140. Lever external portion 152 is located adjacent the handle so that a user grasping the router handle can reach the lever external portion 152 and rotate the lever toward the handle in the direction of arrow 32 thereby causing the locking mechanism 220 to lock the motor housing assembly relative to the base planing end shafts. As described with reference to the previous embodiment, lever 146 is coupled to lock disc 156 via an actuator rod 154 which causes the lock disc 156 to rotate in response to the movement of lever 146.

The shape of lock disc 156 is simply a matter of design choice and is used main common parts with the prior embodiment. It should be appreciated that a non-circular lock member having an arm extending from a threaded boss would function quite satisfactorily.

In the previous embodiment described with reference to FIGS. 1-5, the lock disc locks guide sleeve to the guide tube when the disc was rotated counter-clockwise. In the alternative embodiment shown in FIGS. 6 and 7, the lock disc when rotated clockwise locks the guide sleeve 138 to guide tube 136. Guide sleeve clamp 168 is provided with a boss having a threaded aperture 166. In this embodiment of the invention, the boss aperture is provided with right hand threads since it is desired to cause the lock disc to move inwardly toward guide tube 136 in response to lever 146 being pulled toward handle 140 by the user. Of course it should be appreciated that a left hand thread could be utilized if actuator rod 154 were relocated to engage lock disc 156 below its axis so that the disc would rotate counter-clockwise in response to lever 146 being pulled in the direction of arrow 32 by the user.

Lock disc 156 is provided with a threaded boss 164 which cooperates with the threaded aperture 166 in sleeve clamp 168. Like the previous embodiment, lock disc 156 is provided with an internal threaded bore 180 which receives hexagonal drive set screw 186. In the embodiment illustrated, set screw 186 directly engages guide tube 136 to serve as a friction member cooperating with the lock disc to engage the guide tube in response to the axial displacement of the lock disc when the disc is rotated to the locked position.

It should be appreciated that a replaceable soft metal plug such as brass plug 82 shown in FIG. 5 can be interposed between set screw 186 and guide tube 136. The advantage of a soft metal plug is that the plug need not rotate and the surface engaging guide tube 136 can wear to form a semi-cylindrical surface having greater contact are than the line contact inherent with a set screw. It should be appreciated of course, that guide sleeve 138 is provided with an aperture generally aligned with threaded aperture 166 and bracket 168 enabling the set screw and/or soft metal plug to directly engage the guide tube 136.

In order to maintain the router motor housing assembly free to move relative to the router base and the guide tubes, a return spring 234 is provided which biases the lever 146 to an unlocked position, i.e. biased away from handle 140. In order to the lock the motor housing on guide shaft 136, the user who would extend the finger tips of his or her left hand and pull the lever free end 152 toward handle 140. Once lever 146 is moved sufficiently to lock the motor housing in place, ball 228 engages detent recess 230 in lever 146. Ball 228 is biased by coil spring 232 which urges the ball into engagement with detent recess 230. This detent mechanism provides sufficient load to maintain the lever 146 in the locked position in spite of the load of return spring 234 which urges the lever back to the locked position.

When the user wishes to release the motor housing assembly relative to guide tube, the user with the finger tips on his or her left hand can push lever free end 152 away from handle 140, overcoming the force of ball and spring detent mechanism 228–230 enabling the return spring 234 to return the lever 146 to the unlocked position illustrated in FIG. 6.

The detent mechanism of the alternative embodiment shown in FIGS. 6–7 is used to retain the lock disc in the locked position, while the detent mechanism described with reference to the first embodiment and shown in FIG. 4, maintains the lock disc in the unlocked position. The systems, however, have much in common. Each uses a lock or detent mechanism to retain the lock disc in one of a lock or release positions and a spring is provided for urging the lock disc to the other offset lock and unlocked positions. In the first embodiment, torsion spring 90 acts directly upon lock disc 56, while in the second embodiment the torsion spring 234 acts upon lever 146. Since the lever and locking disc are interconnected by actuator rod 54 and 154 where the spring is located is simply a matter of design choice.

Another common feature to both embodiments of the invention is the location of the lever relative to the housing and handle. Levers 46 and 146 in the first and second embodiments are each pivotably connected to the router housing and rotatable about a pivot axis which extends parallel and spaced adjacent to guide tube. Pivoting levers 46 and 146 about the lever pivot axis causes lock discs 56 and 156 to rotate upon an axis normal to guide tube then respective guide tubes.

Having described a preferred embodiment of the locking mechanism with reference to the drawings, it is understood that those skilled in the art may make certain changes and improvements within the scope of the appended claims.

What is claimed is:

1. A depth of cut locking mechanism for a plunge-type router which locks the position of a router relative to a base plate, the router having a motor housing provided with a pair of spaced apart handles to be grasped by a user, said housing being connected to the base plate by a pair of spatially separated telescoping guides, each of the telescoping guides having a guide sleeve fixedly disposed in the motor housing and a guide tube attached to the base plate, the guide tube is slidably received in the guide sleeve, said locking mechanism comprising:

a lever pivotably connected to the motor housing, said lever having a free and positioned adjacent one of the handles, said free end being displaceable by the user between a lock position and a release position while grasping said adjacent handle;

a mounting bracket securing said guide sleeve and having a threaded aperture extending therethrough;

a lock member having a threaded boss threadably received in said threaded aperture, said lock member rotatable about an axis concentric with said threaded boss between a lock position and a release position, said lock member being axially displaced toward said guide tube when rotated from said release position toward said lock position and axially displaced away from said guide tube when said lock member is rotated from said lock position toward said release position;

an actuator rod pivotably connecting said lock member to said release lever to rotate said lock member between said locked position and said release position;

a friction member cooperating with the lock member to lock said motor housing to said guide sleeve in response to lock member being rotated to said locked position; and wherein said actuator rod has one end pivotably connected to said lever and an opposite end pivotably connected to said lock member at a location offset from said lock member axis.

2. The lock mechanism of claim 1 further comprising:

a detent mechanism for maintaining said lever and associated lock member in one of said lock or release positions; and a spring for urging said lever and associated lock member to the other of said lock and unlock positions.

3. The locking mechanism of claim 2 wherein said spring comprises a torsional spring providing a torque upon said lock member, said torsional spring having a stationary end connected to said motor housing and a free end connected to said lock member to urge the lock member to the lock position.

4. The locking mechanism of claim 2 wherein said spring urges said lever and associated lock member to the unlocked position.

5. The locking mechanism of claim 1 wherein said friction member comprises:

an aperture provided through said lock member concentric with said lock member axis, said aperture having a threaded portion; and a set screw threadably received in said threaded portion of said lock member aperture in an adjustable manner so that said set screw forcibly engages said guide tube to frictionally lock said motor housing to said guide sleeve when said lock member is rotated to said lock position.

6. The locking mechanism of claim 5 wherein the friction member further comprises a soft metal plug interposed between said set screw and said guide tube, said plug extending through and cooperating with an aperture formed in said guide sleeve in general alignment with said mounting bracket threaded aperture.

7. The locking mechanism of claim 1 wherein said lever pivots about a pivot axis aligned parallel to one said guide tubes.

8. The locking mechanism of claim 1 wherein said lever is provided with an end extending external to the housing, adjacent to one of said housing handles and within reach of the user's hand so that the user can move the lever between the lock and release positions while maintaining the user's hand in contact with the router handle.

9. A plunge-type router comprising:

a motor housing enclosing a drive motor, said drive motor having a shaft extending external to said motor housing and adapted to have a cutting tool secured, said motor housing provided with a pair of spaced apart handles to be grasped by a user, said housing being;

a base plate;

a pair of spatially separated telescoping guides, each of said telescoping guides of said pair of telescoping guides having a guide sleeve fixedly disposed in said motor housing and a guide tube attached to said base plate, each of said guide tubes being slidably received in its associated guide sleeve;

a lever pivotably connected to the motor housing, said lever having a free and positioned adjacent one of the handles, said free end being displaceable by the user between a lock position and a release position while grasping said adjacent handle;

a mounting bracket securing said guide sleeve and having a threaded aperture extending therethrough;

a lock member having a threaded boss threadably received in said threaded aperture, said lock member rotatable about an axis concentric with said threaded boss between a lock position and a release position, said lock member being axially displaced toward said guide tube when rotated from said release position toward said lock position and axially displaced away from said guide tube when said lock member is rotated from said lock position toward said release position;

an actuator rod pivotably connecting said lock member to said release lever to rotate said lock member between said locked position and said release position;

a friction member cooperating with the lock member to lock said motor housing to said guide sleeve in response to lock member being rotated to said locked position;

a detent mechanism for maintaining said lever and associated lock member in one of said lock or release positions; and a spring for urging said lever and associated lock member to the other of said lock and unlock positions.

10. The plunge-type router of claim 9 wherein said spring comprises a torsional spring providing a torque upon said lock member, said torsional spring having a stationary end connected to said motor housing and a free end connected to said lock member to urge the lock member to the lock position.

11. The plunge-type router of claim 9 wherein said spring urges said lever and associated lock member to the unlocked position.

12. The plunge-type router of claim 9 wherein said actuator rod has one end pivotably connected to said lever and an opposite end pivotably connected to said lock member at a location on said lock member offset from said lock member axis.

13. The plunge-type router of claim 9 wherein said frictional member comprises:

an aperture provided through said lock member concentric with said lock member axis, said aperture having a threaded portion; and a set screw threadably received in said threaded portion of said lock member aperture in an adjustable manner so that said set screw forcibly engages said guide tube to frictionally lock said motor housing to said guide sleeve when said lock member is rotated to said lock position.

14. The plunge-type router of claim 13 wherein a soft metal plug interposed between said set screw and said guide tube, said plug extending through and cooperating with an aperture formed in said guide sleeve in general alignment with said mounting bracket threaded aperture.

15. The plunge-type router of claim 9 wherein said lever pivots about a pivot axis aligned parallel to one said guide tubes.

16. The plunge-type router of claim 9 wherein said lever is provided with an end extending external to the housing, adjacent to one of said housing handles, and within reach of the user's hand so that the user can move the lever between the lock and release positions while maintaining the user's hand in contact with the router handle.

* * * * *